(12) United States Patent
Binninger et al.

(10) Patent No.: US 10,569,220 B2
(45) Date of Patent: Feb. 25, 2020

(54) PROCESS AND DEVICE FOR THE PURIFICATION OF WASTE GAS

(71) Applicant: Chemisch Thermische Prozesstechnik GmbH, Graz (AT)

(72) Inventors: Thomas Binninger, Kainbach bei Graz (AT); Kai Schulze, Graz (AT)

(73) Assignee: Chemisch Thermische Prozesstechnik GmbH, Graz (AT)

( * ) Notice: Subject to any disclaimer, the term of this patent is extended or adjusted under 35 U.S.C. 154(b) by 0 days.

(21) Appl. No.: 15/919,716

(22) Filed: Mar. 13, 2018

(65) Prior Publication Data
US 2018/0214821 A1  Aug. 2, 2018

(30) Foreign Application Priority Data

Jan. 26, 2017  (DE) .................. 10 2017 101 507

(51) Int. Cl.
*B01D 53/00* (2006.01)
*B01D 53/34* (2006.01)
(Continued)

(52) U.S. Cl.
CPC ........... *B01D 53/56* (2013.01); *B01D 53/005* (2013.01); *B01D 53/343* (2013.01); *B01D 53/62* (2013.01);
(Continued)

(58) Field of Classification Search
CPC .............. B01D 53/005; B01D 2251/21; B01D 2251/2067; B01D 2258/0233; B01D 53/72; B01D 53/62; B01D 53/56; B01D 53/343; B01D 2251/2062; B01D 53/8631; B01D 2251/204; B01D 2251/206;
(Continued)

(56) References Cited

U.S. PATENT DOCUMENTS

| | | | | |
|---|---|---|---|---|
| 4,602,673 A | * | 7/1986 | Michelfelder | ..... B01D 53/8631 165/7 |
| 4,739,826 A | * | 4/1988 | Michelfelder | ..... B01D 53/8631 165/133 |

(Continued)

FOREIGN PATENT DOCUMENTS

| | | | | |
|---|---|---|---|---|
| DK | 161869 B | * | 8/1991 | ......... B01D 53/8631 |
| KR | 2017 002870 A | * | 1/2017 | ......... B01D 53/8631 |

(Continued)

*Primary Examiner* — Timothy C Vanoy
(74) *Attorney, Agent, or Firm* — Tucker Ellis LLP; Michael G. Craig; Heather M. Barnes

(57) ABSTRACT

For the purification of waste gas containing carbon compounds and nitrogen oxides by means of a regenerative post-combustion system, at least two regenerators (A, B, C) filled with heat accumulator bodies (7a, 7b, 7c) and connected by a combustion chamber (10) are provided, wherein the waste gas is alternately heated in a regenerator (A, B, C), the carbon compounds are oxidised in the combustion chamber (10), and, with the addition of a nitrogen-hydrogen compound, the nitrogen oxides are reduced in the combustion chamber (10) thermally and thus not catalytically. Remaining nitrogen oxides are removed by means of a catalytically active heat accumulator layer (6a, 6b, 6c) and the addition of a further nitrogen-hydrogen compound in the regenerator (A, B, C) from which the clean gas exits.

18 Claims, 2 Drawing Sheets

(51) Int. Cl.
*B01D 53/56* (2006.01)
*B01D 53/62* (2006.01)
*B01D 53/72* (2006.01)

(52) U.S. Cl.
CPC ...... *B01D 53/72* (2013.01); *B01D 2251/2062* (2013.01); *B01D 2251/2067* (2013.01); *B01D 2251/21* (2013.01); *B01D 2257/502* (2013.01); *B01D 2258/0233* (2013.01)

(58) Field of Classification Search
CPC ........... B01D 2255/20707; B01D 2255/20723; B01D 2257/502; B01D 2258/0283; B01D 2257/404; B01D 2257/406; C10G 70/00; F28D 20/003; F28D 20/0056; Y02A 50/2341; Y02A 50/2344; Y02A 50/2346
See application file for complete search history.

(56) References Cited

U.S. PATENT DOCUMENTS

| | | | | |
|---|---|---|---|---|
| 4,756,891 A * | 7/1988 | Ohlmeyer | ......... | B01D 53/8625 423/235 |
| 4,898,530 A * | 2/1990 | Wills | .................. | B01D 53/56 423/237 |
| 5,169,611 A * | 12/1992 | Kupper | ................ | B01D 53/005 423/210 |
| 5,233,934 A * | 8/1993 | Krigmont | .............. | B01D 53/56 110/345 |
| 5,547,650 A * | 8/1996 | Edgar | .................... | B01D 53/56 423/212 |
| 5,589,142 A * | 12/1996 | Gribbon | ............ | B01D 53/8656 422/171 |
| 7,399,451 B1 * | 7/2008 | Heed | ...................... | B01D 53/56 422/175 |
| 8,939,761 B2 * | 1/2015 | Mulleder | ............. | B01D 53/869 422/168 |
| 9,272,240 B2 * | 3/2016 | Schedler | ............... | B01D 53/005 |
| 2009/0130011 A1* | 5/2009 | Abrams | ............ | B01D 53/8625 423/239.1 |
| 2012/0315205 A1* | 12/2012 | Schedler | ............. | B01D 53/005 423/235 |
| 2016/0339382 A1* | 11/2016 | Mulleder | ........... | B01D 53/8653 |
| 2018/0142962 A1* | 5/2018 | Mori | .................... | F28F 21/087 |

FOREIGN PATENT DOCUMENTS

NL    9400697 A * 11/1994 ......... B01D 53/8631
WO    WO 0127027 A1 * 4/2001 ............. B01D 53/56

\* cited by examiner

A-B

B-C

C-A

⋈ closed
▶◀ open

PROCESS AND DEVICE FOR THE PURIFICATION OF WASTE GAS

RELATED DOCUMENTS

This application claims priority to German Patent Application No. 10 2017 101 507.8, filed Jan. 26, 2017, and titled PROCESS AND DEVICE FOR THE PURIFICATION OF WASTE GAS, incorporated by reference in its entirety herein.

The invention relates to a process for the purification of waste gas according to the preamble of claim 1. Another subject matter of the invention is a device for carrying out the process.

BACKGROUND

A process according to the preamble of claim 1 is known from DE 10 2009 055 942 B4 is a regenerative thermal combustion system, the carbon compounds are oxidised in the multi-stage combustion chamber at a temperature of more than 800° C. and the nitrogen oxides are thermally reduced by adding a nitrogen-hydrogen compound.

In the production of cement, but also in other industrial processes where fuels are combusted to generate high temperatures, environmental protection aspects as well as raw material and fuel costs are playing an increasingly important role. In particular, emissions of nitrogen oxides ($NO_x$), ammonia ($NH_3$) and carbon monoxide (CO) are to be reduced, while fuel and raw material costs are to be reduced by a reduction in the quantity of fuel as well as low-cost fuels and raw materials, so-called secondary fuels or secondary raw materials. In addition to organic carbon compounds, such gases also contain carbon monoxide and ammonia. When the ammonia ($NH_3$) or urea used as a reducing agent is dosed into the combustion chamber, there is a risk that an ammonia slip will occur as a by-product and therefore harmful ammonia will escape into the atmosphere.

The object of the invention is to provide waste gas purification, in particular for the cement industry, which reduces emissions of organic pollutants as well as carbon monoxide, nitrogen oxides and ammonia by reducing fuel/raw material costs.

SUMMARY

According to the invention, this is achieved by the process characterized in claim 1. In claims 2 to 13, preferred embodiments of the process according to the invention are described. The subject matters of claims 14 to 17 are preferred devices for carrying out the process according to the invention.

According to the invention, the waste gas is purified from nitrogen oxides ($NO_x$), ammonia ($NH_3$) and combustible carbon compounds. The carbon compound can, for example, be carbon monoxide or an organic carbon compound, e.g. benzene, dioxins or furans.

The waste gas is supplied to at least two regenerators filled with heat accumulator bodies and connected by a combustion chamber. Preferably, ceramic, prism-shaped heat accumulator bodies with a plurality of channels parallel to the main prismatic axis are used as heat accumulator bodies, in particular such as described in EP 0472605 B2.

The waste gas is alternately supplied in cycles to at least one regenerator the heat accumulator bodies of which have been preheated. The waste gas preheated in this way is supplied to the combustion chamber, which has a high temperature of more than 800° C., in particular 850 up to 1000° C. At this high temperature, the carbon compounds in the combustion chamber are combusted by the atmospheric oxygen in the waste gas, whereas the nitrogen oxides are reduced by means of a nitrogen-hydrogen compound in the combustion chamber at this high temperature.

The clean gas formed is then drawn off by at least one further regenerator, with its heat accumulator bodies being heated, whereas at the same time the waste gas is cooled down again.

Preferably at least one further regenerator is provided, which, after the raw gas cycle, is purged with clean gas drawn off from the combustion chamber. Instead of two or three regenerators, for example, a plurality of regenerators can also be provided, with the same number of waste gas regenerators and clean gas regenerators and one regenerator for purging being provided in each case.

According to the invention, the oxidation of the carbon compounds and the reduction of the nitrogen oxides in the waste gas are first carried out thermally, i.e. without the use of a catalyst, by reaction of the nitrogen oxides with organic components as well as CO in a first zone of the combustion chamber, which extends from the heat accummulator bodies of the regenerator to which the waste gas is supplied up to the connecting area at which adjacent regenerators are connected. Only in a second zone of the combustion chamber, which essentially extends through the space of the combustion chamber above the connecting area of the regenerators, will the remaining nitrogen oxide as well as a nitrogen-hydrogen compound, e.g. ammonia in the form of an evaporated aqueous solution, be thermally brought to reaction with formation of nitrogen. Thus, a regenerative thermal post-combustion system is used, by means of which, in addition to the oxidation of organic pollutants, $NO_x$ is also reduced to nitrogen ($N_2$) in two stages.

While the carbon monoxide is largely oxidised to carbon dioxide in the combustion chamber, according to the invention, part of the nitrogen oxides is reduced to nitrogen already by the carbon monoxide. In addition, nitrogen is formed due to the reduction of the nitrogen oxides by means of the nitrogen-hydrogen compound. Preferably, ammonia, urea or carbamic acid is used as a nitrogen-hydrogen compound.

The nitrogen-hydrogen compound for reducing the nitrogen oxides can be supplied to the combustion chamber of the regenerative thermal post-combustion system or can already be carried along in part with the waste gas.

The nitrogen-hydrogen compound is preferably supplied to the combustion chamber as an aqueous solution. Here, the solution may contain additives to decrease the reaction temperature required, for example organic compounds such as alcohols. For optimum distribution of the aqueous solution of the nitrogen-hydrogen compound in the combustion chamber, it is possible to use two-fluid nozzles, i.e. a nozzle with a central opening for the aqueous solution and an opening concentric thereto for the compressed gas, or ultrasonic atomizers each having a constant or preferably pulsating pump pressure.

The zone which extends from the connecting area to the heat accumulator bodies of the regenerator from which the clean gas is drawn off is referred to as the third zone.

The nitrogen-hydrogen compound is introduced into the combustion chamber by means of injection devices, preferably injection lances, which are distributed over the cross section of the combustion chamber, preferably between the first and the second zone or the second and the third zone.

When the waste gas already contains part of the nitrogen-hydrogen compound, part of the nitrogen oxides is reduced to nitrogen in the first zone. On the other hand, the nitrogen oxides are reduced to nitrogen in the second zone by means of the nitrogen-hydrogen compound supplied at the beginning of the second zone.

The remaining nitrogen oxides, which are still present in the waste gas when entering the third zone, are reduced to nitrogen by means of the nitrogen-hydrogen compound, which is injected by the injection device at the beginning of the third zone.

The residence time of the waste gas in the first zone and the third zone of the combustion chamber is preferably 0.3 to 1 second, in particular 0.4 to 0.6 seconds in each case, while the residence time of the waste gas in the second zone of the combustion chamber is preferably 0.5 to 2 seconds, in particular 0.8 to 1.5 seconds. A cycle lasts preferably 1 to 4, in particular 2 to 3 minutes.

Since, at the end of each cycle, the temperature of the heat accumulator bodies which the waste gas enters and thus the temperature in the first and the second zone of the combustion chamber, whereby the purification performance is reduced, the amount of the nitrogen compound injected by means of the injection device at the beginning of the third zone is preferably increased in the course of one cycle.

According to the invention, the nitrogen oxides in the waste gas can thus be reduced by such an amount of nitrogen-hydrogen compound that not only the emission of nitrogen oxides but also the release of the nitrogen-hydrogen compound into the atmosphere is prevented and thus the strict limit values for nitrogen oxides as well as for nitrogen-hydrogen compounds, in particular ammonia, can reliably be adhered to.

The process according to the invention is particular suitable for waste gases containing nitrogen oxides with a high content of organic and/or inorganic carbon compounds, for example a carbon monoxide content of more than 0.1 percent by volume, in particular more than 0.4 percent by volume. The combustion enthalpy of the carbon compounds can ensure autothermal operation of the post-combustion system. This means that no additional fuel is required to operate the post-combustion system. The burner in the combustion chamber, if provided for, is therefore only used to start up the post-combustion system.

The purification of waste gas according to the invention can thus be used in industrial processes in which fuels and/or raw materials are used which have not previously been usable due to the formation of odour, volatile organic compounds (VOCs) and carbon monoxide.

Therefore, the purification of waste gas according to the invention is particularly suitable for waste gases resulting from industrial processes in which nitrogen oxides are formed due to a high process temperature in the presence of air and, in addition, carbon compounds such as carbon monoxide and organic compounds are produced. This is also the case, for example, when burning lime, and also in the steel industry, for example.

According to the invention, at least one catalytically active heat accumulator layer is each provided as a lower part of the regenerators. This means that each regenerator has at least one catalytically active heat accumulator layer at its lower area facing away from the combustion chamber, and at least one catalytically active heat accumulator layer on the side facing the combustion chamber.

At the same time, the catalytically active heat accumulator layer preferably forms a heat exchanger, that is to say that there is no functional separation between the heat accumulator bodies.

Preferably, the nitrogen-hydrogen compound supplied to the combustion chamber is supplied in a hyperstoichiometric manner, with the catalytically active heat accumulator layer using the additionally formed ammonia in order to improve the reduction of the nitrogen oxides.

A hyperstoichiometric dosage of the nitrogen-hydrogen compound can be of advantage, because the catalytically active heat accumulator layer can accumulate excess nitrogen-hydrogen compound, which already reduces part of the nitrogen oxides of the raw gas during the next raw gas cycle when the raw gas flows into the regenerator.

As a nitrogen-hydrogen compound for reducing the nitrogen oxides, an aqueous solution of ammonia, carbamic acid or urea with or without additives is preferably used to decrease the reaction temperature required. By means of the catalytically active heat accumulator layer, dioxins and furans can also be removed from the waste gas by the regenerative thermal post-combustion system according to the invention.

The temperature of the catalytically active heat accumulator layer from which the clean gas is drawn off being required for the catalytic reduction, is preferably between 150 and 300° C.

The process according to the invention is particularly suitable for the purification of waste gases arising during the production of cement clinker.

Secondary fuels and secondary raw materials are used in most cases for the production of cement clinker. In particular, cost-effective waste products such as used tyres, waste oils, plastic waste, or biogenic fuels such as paper fibre residues or meat-and-bone meal are used as such. The waste gas thus has a sufficient carbon monoxide content for autothermal operation of the regenerative thermal post-combustion system.

During the production of cement clinker, the hot waste gas formed by the primary combustion of the rotary kiln is supplied to a heat exchanger for preheating the raw meal. Preferably, the nitrogen oxides formed mainly by the primary combustion of the rotary kiln are therefore partially degraded in the waste gas by supplying a nitrogen-hydrogen compound through a selective non-catalytic reduction before the waste gas is supplied to the heat exchanger for preheating the raw meal. The waste gas exiting this heat exchanger can then be purified by the process according to the invention.

In the process, the nitrogen-hydrogen compound can be supplied in a hyperstoichiometric ratio.

The catalytically active heat accumulator layer of the regenerative post-combustion system according to the invention can contain titanium oxide, tungsten oxide and/or vanadium oxide or be formed from these substances.

The catalytically active layer can consist of catalyst elements which have a height from 100 to 1000 mm, preferably from 300 to 600 mm, in the flow direction of the gas.

Instead of three regenerators for the supply of waste gas, the discharge of clean gas or for purging, the regenerative thermal post-combustion system according to the invention can also have a plurality of parallel regenerators for the supply of waste gas, the discharge of clean gas or for purging.

In addition, a separate regenerator can be provided for purging the raw gas out of the regenerator to which the raw gas was supplied during the previous cycle.

Apart from the waste gases arising during the production of cement clinker, the device according to the invention is also suitable for the purification of the waste gases arising during the production of nitric acid, adipic acid, fertiliser or uranium trioxide.

BRIEF DESCRIPTION OF THE DRAWINGS

The invention will be explained in more detail below by way of example with reference to the enclosed drawing, in which.

DETAILED DESCRIPTION

Figure 1:
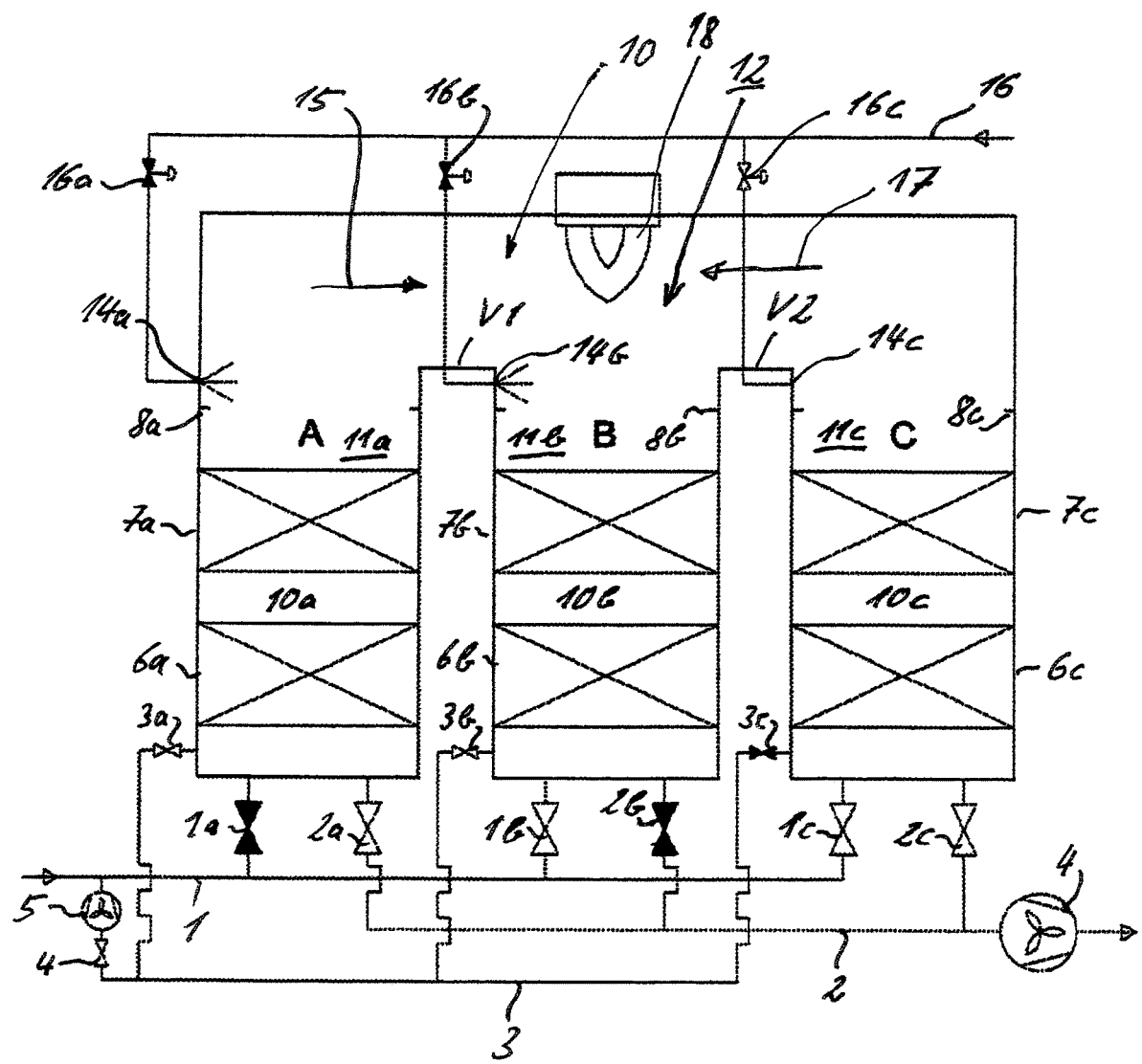
FIG. 1 schematically shows an enlarged view of the operating position A-B of the regenerative thermal post-combustion system, in which the waste gas is supplied to the regenerator A, the clean gas is drawn off from the regenerator B and the regenerator C is purged, and FIG. 2 schematically shows also the two other operating positions B-C and C-A, wherein the waste gas is supplied to the regenerator B, the clean gas is drawn off from the regenerator C and the regenerator A is purged, and the waste gas is supplied to the regenerator C, the clean gas is drawn off from the regenerator A and the regenerator B is purged, respectively.

Each regenerator A, B, C, with its end facing away from the combustion chamber 10 of the regenerative thermal post-combustion systems, is connected via an inlet shut-off device 1a, 1b, 1c to the waste gas duct 1, through which the waste gas to be purified is supplied to the regenerator A, B, C, via an outlet shut-off device 2a, 2b, 2c to the clean gas duct 2, by which the clean gas is released into the atmosphere via a stack, for example, and via a purge gas shut-off device 3a, 3b, 3c to a purge gas duct 3a, 3b, 3c. The shut-off devices can be configured in the form of valves or flaps.

The main fan 4 for generating a negative pressure in the regenerators A, B, C is provided in the clean gas duct 2 downstream of the regenerative thermal post-combustion system. The purge gas duct 3 is connected to the waste gas duct 1 via a shut-off device 4 and an auxiliary fan 5.

Figure 2:
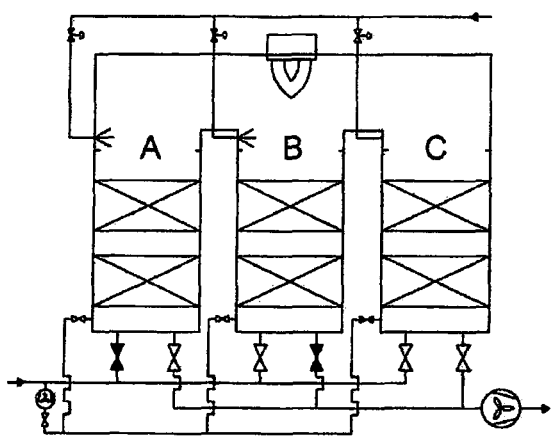
Figure 2:
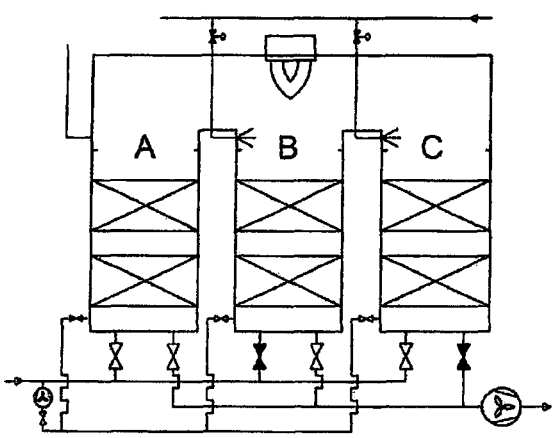
Figure 2:
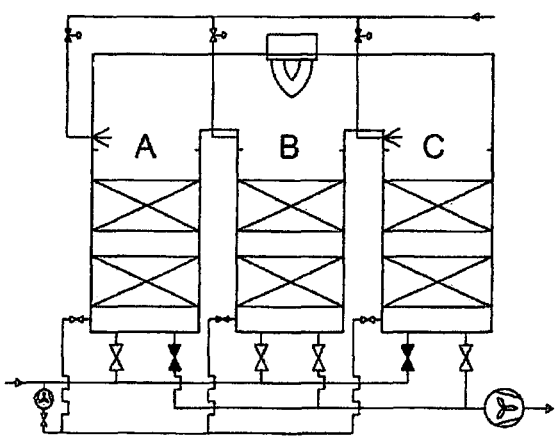

In the operating position A-B according to FIGS. 1 and 2, the waste gas is supplied to the regenerator A, the clean gas is drawn off from the regenerator B and the regenerator C is purged, whereas in the next cycle in the operating position B-C, the waste gas is supplied to the regenerator B, the clean gas is drawn off from the regenerator C and the regenerator A is purged; in the subsequent cycle according to the operating position C-A, the waste gas is supplied to the regenerator C, the clean gas is drawn off from the regenerator A and the regenerator B is purged, whereupon the operating position A-B is taken again in the next cycle.

The waste gas which is supplied via the waste gas duct 1 has a carbon monoxide content of e.g. 0.2 to 1 percent by volume, a nitrogen oxide content of e.g. 100 to 1000 mg/Nm$^3$ and an oxygen content of e.g. 8 to 13 percent by volume, the remainder being substantially nitrogen, water and carbon dioxide.

Each regenerator A, B, C has a catalytically active heat accumulator layer 6a, 6b, 6c at its lower area facing away from the combustion chamber 10 as well as heat accumulator bodies 7a, 7b, 7c at a distance above the catalytically active heat accumulator layer 6a, 6b, 6c on the side facing the combustion chamber 10.

The catalytically active heat accumulator layer 6a, 6b, 6c is separated from the heat accumulator bodies 7a, 7b, 7c arranged above by a space 10a, 10b, 10c.

This means that the catalytically active heat accumulator layer 6a, 6b, 6c can be separately purified or removed from the regenerator A, B, C, for example.

In addition, each regenerator A, B, C optionally has a necking 8a, 8b, 8c above the heat accumulator bodies 7a, 7b, 7c and below the connecting area V1, V2 at which two adjacent regenerators A, B, C are connected to each other.

The combustion chamber 10 of the regenerative thermal post-combustion system consists of several zones, namely the zones 11a, 11b, 11c between the heat accumulator bodies 7a, 7b, 7c and the connecting area V1, V2 of the respective regenerator A, B, C and the zone 12 above the connecting areas V1, V2.

The first zone is the zone 11a, 11b, 11c between the heat accumulator bodies 7a, 7b, 7c and the connecting area V1, V2 of the regenerator A, B, C to which the waste gas from the waste gas duct 1 is supplied, thus the zone 11a in FIGS. 1 and 2 in the operating position A-B.

In the first zone 11a, 11b, 11c, carbon monoxide and/or organic compounds are combusted in the waste gas.

At the level of the connecting areas V1, V2, one injection device 14a, 14b, 14c each is provided on each regenerator A, B, C.

In the second zone 12, which is formed by the zone above the connecting areas V1, V2, the nitrogen oxides in the waste gas exiting the first zone 11a, 11b, 11c are largely reduced to nitrogen by means of a nitrogen-hydrogen compound injected by the injection device 14a, 14b, 14c arranged above in each case, namely thermally, i.e. not catalytically.

The third zone 11a, 11b, 11c is formed by the zone between the connecting area V1, V2 and the heat accumulator bodies of the regenerator A, B, C from which the waste gas is supplied to the clean gas duct 2, thus the zone 11b in the operating position A-B according to FIGS. 1 and 2.

In the third zone 11a, 11b, 11c, a further nitrogen-hydrogen compound is injected into the waste gas exiting the second zone 12 by means of the injection device 14a, 14b, 14c at the level of the connecting zone V1, V2, thus the zone 11b in the operating position A-B according to FIGS. 1 and 2, in order to catalytically reduce the remaining nitrogen oxides to nitrogen by means of the catalytically active heat accumulator layer 6a, 6b, 6c.

The fourth zone of combustion chamber 10, which is formed by the zone between the connecting areas V1, V2 and the heat accumulator bodies 7a, 7b, 7c, thus the zone 11c in the operating position A-B according to FIGS. 1 and 2, is supplied with purified gas from the second zone 12 in order to purify the heat accumulator bodies 7a, 7b, 7c and the catalytically active heat accumulator layer 6a, 6b, 6c, thus the heat accumulator bodies 7c and the catalytically active heat accumulator layer 6c in the operating position A-B according to FIGS. 1 and 2, from raw gas residues by sucking this gas into the purge gas duct 3.

According to the invention, the reduction of the nitrogen oxides by carbon compounds, such as carbon monoxide, in the waste gas in the operating position A-B in the first zone 11a, for example, and the reduction of the nitrogen oxides by means of the nitrogen-hydrogen compound injected by the injection device 14a in the second zone 12 are thus carried out purely thermally, while after the nitrogen-hydrogen compound has been injected by the injection device 14b and after the regenerator 7b has been passed through, a catalytic reduction of the remaining nitrogen oxide on the catalytically active heat accumulator layer 6b takes place in the third zone 11b.

After this first cycle, the cycle is switched over to the next cycle according to the operating position B-C, then to the cycle according to the operating position C-A and then back to the cycle according to the operating position A-B according to FIG. 2.

The waste gas from the waste gas duct 1 is thus supplied alternately to the regenerators A, B and C, wherein, as can be seen from FIGS. 1 and 2, the waste gas to be purified is supplied to the preheated regenerator A, and the clean gas is drawn off via the regenerator B so that a gas flow according to the arrow 15 is generated in the combustion chamber 10.

If a waste gas containing a nitrogen-hydrogen compound and/or carbon monoxide is supplied to the preheated heat accumulator bodies of the regenerator A, B, C, part of the nitrogen oxides in the waste gas in the first zone 11a, 11b, 11c will be reduced.

The nitrogen-hydrogen compound supplied at the beginning of the second zone 12 via the injection device 14a, 14b, 14c leads to a thermal reduction of the nitrogen oxides in the second zone 12.

On the other hand, by injecting the nitrogen-hydrogen compound via the injection device at the end of the second zone 12 or at the beginning of the third zone 11a, 11b, 11c, further amounts of nitrogen oxide are catalytically reduced in the catalytically active heat accumulator layer 6a, 6b, 6c.

By means of the shut-off devices 16a, 16b, 16c in the supply duct 16 for the nitrogen-hydrogen compound to the injection devices 14a, 14b and 14c, the supply of the nitrogen-hydrogen compound can be regulated in each case in such a way that a continuous increase in the added nitrogen-hydrogen compound takes place over the course of one cycle of operation.

Since the heat accumulator layer 6a, 6b, 6c and the heat accumulator bodies 7a, 7b, 7c cool down in the course of one cycle of operation due to the waste gas supplied, thereby decreasing the temperature in the zone 12 of the combustion chamber 10, the non-catalytic thermal reduction rate is decreased for reducing the nitrogen oxides in the combustion chamber 10.

The decreased reduction rate due to non-catalytic thermal reduction in the zone 12 can thus be compensated for by an increased supply of a nitrogen-hydrogen compound into the third zone 11a, 11b, 11c, thus by means of the injection device 14b in the operating position A-B according to FIGS. 1 and 2, which is supplied to the catalytically active heat accumulator layer 6b, i.e. by increasing the reduction rate due to catalytic reduction.

Especially in the case of autothermal operation of the post-combustion system, the burner 18 serves to start the system.

The example below, which was carried out using a system for the production of cement clinker and a system for the purification of waste gas according to FIGS. 1 and 2, serves the purpose of further explaining the invention.

EXAMPLE

A waste gas from a rotary kiln for the production of clinker has the following composition:
15 percent by volume of carbon dioxide
0.5 percent by volume of carbon monoxide
10 percent by volume of oxygen
500 mg/Nm$^3$ of nitrogen oxides
30 mg/Nm$^3$ of ammonia
100 mg/Nm$^3$ of organic carbon.

The waste gas with a volume of 300,000 Nm$^3$/h reaches the regenerative thermal post-combustion system via the duct 1 with the fan 4. The heat accumulator bodies, for example of the regenerator A, heat the waste gas to a temperature of 900° C., at which, in the first zone 11a of the combustion chamber 10, the nitrogen oxides are reduced by the still existing excess ammonia introduced into the waste gas in the system during the previous cycle and by part of the carbon monoxide with the formation of nitrogen. The excess amount of carbon monoxide is oxidised to carbon dioxide by the existing oxygen of the waste gas and contributes to the autothermal mode of operation of the post-combustion system. The volatile organic pollutants and the odour-active substances in the waste gas also combust into carbon dioxide and water vapour in the first zone 11a of the combustion chamber 10.

After leaving the first zone 11a of the combustion chamber 10, the waste gas has the following composition:
15 percent by volume of carbon dioxide
0.1 percent by volume of carbon monoxide
9.6 percent by volume of oxygen
400 mg/Nm$^3$ nitrogen oxides
25 mg/Nm$^3$ of ammonia
0 mg/Nm$^3$ of organic carbon.

At the beginning of the second zone 12 of the combustion chamber 10, 150 kg/h of a 25 percent ammonia solution is injected into water in the direction of flow according to the arrow 15 in order to reduce further amounts of still existing nitrogen oxides. The clean gas is drawn off via the regenerator B, for example. At the end of the second zone 12 of the combustion chamber 10, i.e. at the beginning of the third zone 11b, a further 80 kg/h of a 25 percent by weight ammonia solution is injected into water in the direction of flow in order still to reduce additional amounts of existing nitrogen oxides and to produce an excess of ammonia.

At the end of the third zone 11b of the combustion chamber 10, the purified waste gas has the following composition:
15 percent by volume of carbon dioxide
0 percent by volume of carbon monoxide
9.5 percent by volume of oxygen
250 mg/Nm$^3$ nitrogen oxides
95 mg/Nm$^3$ of ammonia
0 mg/Nm$^3$ of organic carbon.

After passing through the catalytically active layer 6b of the clean gas regenerator B, the waste gas has the following composition:
15 percent by volume of carbon dioxide
0 percent by volume of carbon monoxide
9.5 percent by volume of oxygen
150 mg/Nm$^3$ nitrogen oxides
5 mg/Nm$^3$ of ammonia
0 mg/Nm$^3$ of organic carbon.

If the direction of flow is reversed according to the arrow 17, the dosing of the injected ammonia solution is reversed. The direction of flow is reversed approximately every two to three minutes. The clean gas leaves the post-combustion system at a temperature averaging 40° C. above the inlet temperature.

What is claimed is:
1. Process for the purification of waste gas containing carbon compounds and nitrogen oxides in a regenerative post-combustion system which has at least two regenerators (A, B, C) filled with heat accumulator bodies (7a, 7b, 7c) and connected by a combustion chamber (10), wherein the waste gas is heated alternately in at least one regenerator (A,

B, C) to which it is supplied, the carbon compounds are oxidised in the combustion chamber (10), and, with the addition of a nitrogen-hydrogen compound as a reducing agent, a simultaneous reduction of the nitrogen oxides takes place in the combustion chamber (10), and the hot clean gas formed is drawn off by means of at least one further regenerator (A, B, C), characterized in that a catalytically active heat accumulator layer (6a, 6b, 6c) reducing remaining nitrogen oxides to nitrogen using a nitrogen-hydrogen compound is each provided as a lower part of the regenerator (A, B, C), wherein said catalytically active heat accumulator layer (6a, 6b, 6c) is separated from the heat accumulator bodies (7a, 7b, 7c), which are separated above the heat accumulator layer by a space (10a, 10b, 10c), and wherein the catalytically active heat accumulator layer (6a, 6b, 6c) can be separately purified or removed from the regenerator (A, B, C).

2. Process according to claim 1, characterized in that the catalytically active heat accumulator layer (6a, 6b, 6c) is configured in the form of a honeycomb block having prismatic channels.

3. Process according to claim 1, characterized in that the catalytically active heat accumulator layer (6a, 6b, 6c) is used simultaneously as a heat exchanger in which part of the heat of the gas flowing out is accumulated and is available to the raw gas flowing in after the switch-over.

4. Process according to claim 1, characterized in that the nitrogen-hydrogen compound supplied to the combustion chamber (10) is supplied in a hyperstoichiometric manner, wherein the catalytically active heat accumulator layer (6a, 6b, 6c) uses the additionally available nitrogen-hydrogen compound for reducing the nitrogen oxides.

5. Process according to claim 1, characterized in that at least part of the nitrogen-hydrogen compound for reducing the nitrogen oxides is already supplied with the waste gas.

6. Process according to claim 1, characterized in that aqueous solutions of ammonia, carbamic acid or urea are used as a nitrogen-hydrogen compound for reducing the nitrogen oxides in order to decrease the reaction temperature required.

7. Process according to claim 1, characterized in that the catalytically active heat accumulator layer (6a, 6b, 6c) also reduces dioxins and furans in the waste gas.

8. Process according to claim 1, characterized in that, during the course of a partial cycle as the combustion chamber temperature decreases, the amount of a nitrogen-hydrogen compound supplied is continuously increased in the third zone (11a, 11b, 11c) of the combustion chamber (10) of the regenerator (A, B, C) from which the clean gas is drawn off.

9. Process according to claim 1, characterized in that the temperature required for the selective catalytic reduction in the area of the catalytically active heat accumulator layer (6a, 6b, 6c) is between 150 and 300° C., which is reached by dissipating the heat of the gases drawn off from the combustion chamber (10) to the heat accumulator layer (6a, 6b, 6c) passed through.

10. Process according to claim 1, characterized in that the nitrogen-hydrogen compound of the third zone (11a, 11b, 11c) of the combustion chamber (10) of the regenerator (A, B, C) from which the clean gas is drawn off is supplied in a hyperstoichiometric ratio.

11. Process according to claim 1 for the purification of the waste gases arising during the production of cement clinker.

12. Process according to claim 11, characterized in that secondary fuels/raw materials are used for the production of cement clinker so that the waste gas has a sufficient carbon monoxide content for the autothermal operation of the regenerative thermal post-combustion system.

13. Process according to claim 11, characterized in that the nitrogen oxides in the waste formed mainly by the primary combustion of the rotary kiln are partially degraded gas by supplying a nitrogen-hydrogen compound through a selective non-catalytic reduction before the waste gas is supplied to a heat exchanger for preheating the raw meal.

14. A regenerative post-combustion device for carrying out the purification of waste gas containing carbon compounds and nitrogen oxides process according to claim 1, comprising:
at least two regenerators filled with heat accumulator bodies and connected by a combustion chamber wherein the waste gas is heated alternately in at least one regenerator to which it is supplied, the carbon compounds are oxidised in the combustion chamber, and, with the addition of a nitrogen-hydrogen compound as a reducing agent, a simultaneous reduction of the nitrogen oxides takes place in the combustion chamber, and the hot clean gas formed is drawn off by means of at least one further regenerator;
characterized in that the catalytically active heat accumulator layer (6a, 6b, 6c) contains titanium oxide, tungsten oxide and vanadium oxide as a catalyst.

15. Device for carrying out the process according to claim 14, characterized in that the catalytically active layer (6a, 6b, 6c) consists of elements which have a height from 100 to 1000 mm.

16. Device according to claim 14, characterized in that instead of three regenerators (A, B, C) which the waste gas enters and which the clean gas exits while the third one is purged, a plurality of parallel inlet and outlet regenerators is available.

17. Device according to claim 14, characterized in that a separate regenerator is provided for purging out the raw gas.

18. Use of the device according to claim 14 for the purification of waste gases arising during the production of cement clinker, nitric acid, adipic acid, fertiliser or uranium trioxide.

* * * * *